United States Patent
Hameau et al.

(10) Patent No.: US 7,602,920 B2
(45) Date of Patent: Oct. 13, 2009

(54) METHOD FOR MAKING SECURE THE PRE-INITIALISING PHASE OF A SILICON CHIP INTEGRATED SYSTEM, IN PARTICULAR A SMART CARD AND INTEGRATED SYSTEM THEREFOR

(75) Inventors: Patrice Hameau, Billancourt (FR); Nicolas Fougeroux, Le Chesnay (FR); Benoît Bole, Versailles (FR)

(73) Assignee: CP8 Technologies, Paris (FR)

( * ) Notice: Subject to any disclaimer, the term of this patent is extended or adjusted under 35 U.S.C. 154(b) by 1466 days.

(21) Appl. No.: 10/049,025

(22) PCT Filed: Jun. 8, 2001

(86) PCT No.: PCT/FR01/01774
§ 371 (c)(1),
(2), (4) Date: Feb. 8, 2002

(87) PCT Pub. No.: WO01/95274
PCT Pub. Date: Dec. 13, 2001

(65) Prior Publication Data
US 2002/0107798 A1    Aug. 8, 2002

(30) Foreign Application Priority Data
Jun. 8, 2000  (FR) .................................. 00 07319

(51) Int. Cl.
*H04L 9/00* (2006.01)
(52) U.S. Cl. .................. 380/278; 380/229; 380/249; 705/41; 713/1; 713/169; 713/172; 713/173; 713/194; 726/2; 726/9; 726/26; 726/27; 726/34
(58) Field of Classification Search .................. 713/168, 713/169, 172, 176, 1, 194; 380/278, 281, 380/284, 30; 705/41; 726/20, 27, 2, 26, 726/34
See application file for complete search history.

(56) References Cited

U.S. PATENT DOCUMENTS
4,910,773 A * 3/1990 Hazard et al. ............... 380/277

(Continued)

FOREIGN PATENT DOCUMENTS
EP    0 440 800    8/1991

(Continued)

*Primary Examiner*—Nasser G Moazzami
*Assistant Examiner*—Shanto M Abedin
(74) *Attorney, Agent, or Firm*—Miles & Stockbridge P.C.

(57) ABSTRACT

A method for secure loading of a key dedicated to securing a predetermined operation into memory of a microchip of an embedded system includes, as a first step, authenticating a security device by generating a first random number using the microchip, transmitting the first random number to the security device, generating a second random number in the security device, generating a first cryptogram from the first and second random numbers by applying an asymmetric signature algorithm using an asymmetric secret key, transmitting at least the first cryptogram to the microchip, and authenticating the security device by verifying the first cryptogram using the public key. A second step includes authenticating the microchip by generating, in the microchip, a secret session key from the first random number by applying a symmetric encryption algorithm using the secret key, generating a second cryptogram by applying a symmetric encryption algorithm using the secret session key, transmitting the second cryptogram to the security device, and authenticating the microchip by verifying the second cryptogram using the session key. A third step includes transferring a dedicated key, encrypted by the session key, into the storage means of the microchip.

11 Claims, 4 Drawing Sheets

U.S. PATENT DOCUMENTS

| | | | |
|---|---|---|---|
| 5,146,499 A * | 9/1992 | Geffrotin | 713/172 |
| 5,299,263 A * | 3/1994 | Beller et al. | 380/30 |
| 5,371,794 A * | 12/1994 | Diffie et al. | 713/156 |
| 5,602,918 A * | 2/1997 | Chen et al. | 713/153 |
| 5,757,918 A * | 5/1998 | Hopkins | 705/67 |
| 5,761,309 A * | 6/1998 | Ohashi et al. | 713/156 |
| 5,825,875 A * | 10/1998 | Ugon | 705/65 |
| 6,005,942 A * | 12/1999 | Chan et al. | 713/187 |
| 6,067,621 A * | 5/2000 | Yu et al. | 713/172 |
| 6,094,724 A * | 7/2000 | Benhammou et al. | 726/20 |
| 6,115,816 A * | 9/2000 | Davis | 713/153 |
| 6,246,771 B1 * | 6/2001 | Stanton et al. | 380/286 |
| 6,393,567 B1 * | 5/2002 | Colnot | 713/182 |
| 6,487,660 B1 * | 11/2002 | Vanstone et al. | 713/168 |
| 6,760,752 B1 * | 7/2004 | Liu et al. | 709/206 |
| 6,820,203 B1 * | 11/2004 | Okaue et al. | 713/193 |
| 6,952,475 B1 * | 10/2005 | Horn et al. | 380/30 |
| 7,100,051 B1 * | 8/2006 | Kipnis et al. | 713/180 |
| 7,243,240 B2 * | 7/2007 | Wang | 713/189 |
| 2005/0060540 A1 * | 3/2005 | Okaue et al. | 713/160 |

FOREIGN PATENT DOCUMENTS

| | | |
|---|---|---|
| EP | 0 285 520 | 10/1998 |
| FR | 2 759 833 | 8/1998 |
| FR | 2 760 871 | 9/1998 |
| FR | 2 767 624 | 2/1999 |
| WO | WO 99 33033 | 7/1999 |

* cited by examiner

METHOD FOR MAKING SECURE THE PRE-INITIALISING PHASE OF A SILICON CHIP INTEGRATED SYSTEM, IN PARTICULAR A SMART CARD AND INTEGRATED SYSTEM THEREFOR

CROSS REFERENCE TO RELATED APPLICATION

The subject matter of the subject invention is related to application Ser. No. 10/049,022 filed on Feb. 8, 2002, in the names of Patrice HAMEAU, Nicolas FOUGEROUX, and Benoit BOLE, entitled "METHOD FOR SECURE STORAGE OF SENSITIVE DATA IN A MEMORY OF AN EMBEDDED MICROCHIP SYSTEM, PARTICULARLY A SMART CARD, AND EMBEDDED SYSTEM IMPLEMENTING THE METHOD", the subject matter of which is incorporated herein in its entirety.

BACKGROUND OF THE INVENTION

1. Field of the Invention

The invention relates to a method for securing a predetermined operation, particularly the pre-initialization phase of an embedded microchip system, through the secure loading of a dedicated-use encryption key.

It applies more particularly to a smart card.

The invention also relates to an embedded system for implementing the method.

In the context of the invention, the term "pre-initialization" is meant in a general sense. It particularly relates to the manufacturing phase of a traditional smart card, or to the phase preceding the initialization phase of a so-called open smart card.

Likewise, the term "embedded system" refers to various systems or devices having in common the fact of using a microchip comprising data storage and data processing means, generally constituted by a microprocessor or a microcontroller. Such an embedded system can be constituted, in particular, by a smart card.

To illustrate the concept, we will consider hereinafter the preferred application of the invention, i.e., the pre-initialization of a smart card.

2. Description of the Related Art

In most smart card-based applications, various functions related to security are devolved to the smart cards. This term itself covers various concepts: confidentiality, authentication, etc.

For this reason, written into a nonvolatile part of the aforementioned storage means of the microchip, in permanent (using "Read Only Memory" or "ROM"), or semi-permanent ("Electrically Erasable Programmable Read Only Memory" or "EEPROM") fashion, is so-called secret data required for these functions: encryption algorithm, secret encryption keys, identification data, etc.

Among this data, there is a so-called fabrication key that traditionally makes it possible to secure all of the steps for pre-initializing the smart card.

Normally, the manufacture of a smart card takes place in two main phases. During the first phase, a microchip is manufactured by a first entity, which will hereinafter be called the "chip manufacturer." During a second phase, this microchip is packaged, then integrated into a substrate, i.e. an approximately rectangular piece of plastic, which constitutes the smart card per se. This operation is generally performed by a second entity, different from the first, which will hereinafter be called the "card manufacturer."

A third entity, which will hereinafter be called a "pre-personalizer," performs the aforementioned pre-initialization operation.

In the prior art, almost systematically, the fabrication key that secures all of the steps in the pre-initialization of a smart card is written in unencrypted form, and without prior authentication by the card manufacturer. This operating mode poses several problems:

- if cards are stolen during their transport from the chip manufacturer to the card manufacturer, there is no guaranteed software security: the cards can be preinitialized fraudulently and then used maliciously;
- a defrauder producing a card that is in any way cloned can insert it into the card-making chain without being detected; and
- simple online espionage makes it possible to obtain the fabrication key, transmitted in unencrypted fashion.

One solution would be to have the fabrication key written by the chip manufacturer during a so-called probe operation, but this solution is very costly, since the secret data must be changed for each card (non-static data), which moreover is detrimental to the production rate of the chip manufacturer. This costly method is therefore not realistic, and because of this, is practically never implemented.

SUMMARY OF THE INVENTION

The object of the invention is to eliminate the drawbacks of the devices of the prior art, some of which have just been mentioned.

To this end, according to a first advantageous characteristic of the invention, the writing of the fabrication key is protected by a mutual authentication between an element known as a "SAM" (for "Security Access Module") and the smart card, in order to prevail over the utilization of a phony "SAM" module in which a cloned smart card or even one having a falsified ROM or other nonvolatile memory. Hereinafter, for simplification purposes, this module will be called "SAM." It can be hosted in a microcomputer or a smart card, for example. Generally, the "SAM" can be defined as being a "key holding" element. In essence, it stores a secret key that is never divulged, in the sense that it is not communicated to the outside world. It is used to calculate other keys that allow the aforementioned mutual identification.

The authentication of the "SAM" by the smart card uses an asymmetric encryption algorithm. It can be, for example, the algorithm widely used in the field of banking applications and known by the abbreviation "RSA" (for "Rivest, Shamir and Adleman," the designated inventors in U.S. Pat. No. 4,405,829 A). However, since a smart card is only equipped with limited computing resources, it is preferable to use the so-called "Rabin" algorithm for this purpose. In fact, in the latter case, less computing power required, which is more suitable for the specific characteristics of a smart card or similar type of device. Also, hereinafter, without in any way limiting the scope of the invention, the asymmetric algorithm used will be considered to be the "Rabin" algorithm.

As for the authentication of the smart card by the "SAM" module, it is advantageously based on a symmetric algorithm, preferably of the so-called "Triple DES" ("Data Encryption System") type.

By using the Rabin algorithm for the authentication of the "SAM" by the smart card and the "Triple DES" algorithm for the authentication of the smart card by the "SAM," the use of a cryptoprocessor is not necessary in order to implement the security mechanism, which is also advantageous in the context of the applications envisaged by the invention.

The method according to the invention then allows the authenticated "SAM" to load the fabrication key securely into the smart card, which is itself authenticated.

Hence, the main subject of the invention is a method for secure loading of a key dedicated to securing a predetermined operation into storage means of a microchip of an embedded system, said dedicated key being contained in a security device that includes means for two-way communication with said microchip, characterized in that, said storage means of said microchip storing a symmetric secret encryption key and an asymmetric public key and said security device storing the same symmetric secret encryption key and the asymmetric secret key corresponding to the public key of said microchip, it comprises:

- a first phase consisting in the authentication of said security device by said microchip and comprising the steps for the generation by the microchip of a first random number and its transmission to the security device, the generation by the latter of a second random number and a first cryptogram from said first and second random numbers by applying an asymmetric signature algorithm using said asymmetric secret key, and its transmission to said microchip in order to perform said authentication of it by verification using said public key;
- a second phase consisting in the authentication of said microchip and comprising the steps for the generation by the microchip and said security device of a secret, so-called session key from said first random number, by applying a symmetric encryption algorithm using said secret encryption key, followed by the generation of a second cryptogram by applying a symmetric encryption algorithm using said secret session key and its transmission to said security device in order to perform said authentication by verification using said session key; and
- a phase for transferring said dedicated key, encrypted by said secret session key, into said storage means of said microchip.

Another subject of the invention is an embedded microchip system for implementing the method.

BRIEF DESCRIPTION OF THE DRAWINGS

The invention will now be described in greater detail by referring to the attached drawings, in which.

Figure 1:
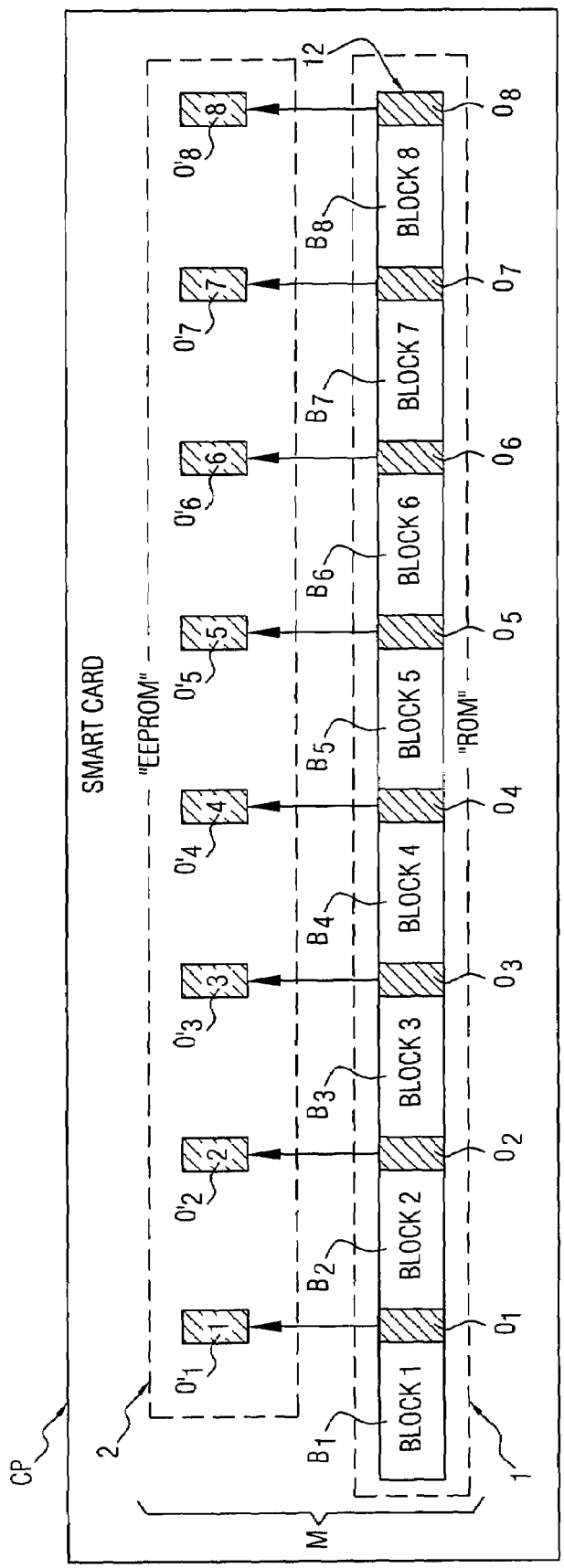
FIG. 1 schematically illustrates an exemplary configuration of the memory of a smart card according to one aspect of the invention, for the storage of a public key.

Hereinafter, without in any way limiting its scope, we will concentrate on the context of the preferred application of the invention, unless otherwise indicated, i.e., the securing of the pre-initialization phase of a smart card.

DESCRIPTION OF THE PREFERRED EMBODIMENTS

The method according to the invention, from the point of view of the smart card and the "SAM" module, requires a symmetric secret key that will hereinafter be called the master key $K_M$. This key $K_M$ must be present when the microchip, or "chip," leaves the entity that is called the "chip manufacturer."

The storage of this key $K_M$ takes place in a nonvolatile part of the memory with which the microchip is equipped: a permanent memory of the ROM type, or semipermanent memory of the EEPROM or a similar type.

In a preferred variant of embodiment of the invention, and according to a first characteristic, the key $K_M$ is "probe" written into EEPROM by the chip manufacturer. The bytes that compose the key $K_M$ are extremely sensitive data and must be treated as security bytes. Storage in EEPROM allows this key $K_M$ to be diversified for several batches of cards.

The method according to the invention, from the smart card point of view, also requires an asymmetric public key that will hereinafter be called the asymmetric public key n. This k, set for all the cards, must be present when the microchip or chip leaves the entity called the "chip manufacturer."

The storage of this key n takes place in a nonvolatile part of the memory with which the microchip is equipped: a permanent memory of the ROM type and/or semi-permanent memory of the EEPROM or a similar type.

In a preferred variant of embodiment of the invention, and according to a second characteristic, the nonvolatile memory of the microchip has a particular hybrid—physical and logical—configuration. A permanent part of the ROM type and a re-programmable, semi-permanent part of the EEPROM type are provided. The bytes of the aforementioned public key are distributed between these two storage areas in the particular way explained below. The bytes must be present when the chip leaves the chip manufacturer.

The "probe" written bytes in the EEPROM part of the memory must be considered to be extremely sensitive, and in this respect, must be treated as security bytes.

For example, to illustrate the concept, we will consider a public key with a length of 768 bits (or 96 bytes). The latter resides completely in ROM. However, according to a preferred embodiment of the method according to the invention, one byte per block of twelve is intentionally stored in an erroneous way in the ROM type storage area, this erroneous value having been purposely written into the code stored in this ROM type part of the memory. The correct value of the byte in question is stored in the EEPROM type part. In this example, eight bytes (i.e., 96/12=8) must therefore be programmed into the EEPROM type part of the memory. This data is static, since a public key is not diversified.

In addition, an operation known as a "hash" is performed on 160 bits of the public key n. The result is stored in ROM, so that it can be verified with each utilization of the key n. To do this, an algorithm of the type known as "SHA-1" is advantageously used. This particular algorithm must therefore be installed in the smart card.

Associated with the particular storage of the public key n, the hash makes it possible to simultaneously guarantee the integrity of both the ROM and EEPROM type parts of the memory.

FIG. 1 schematically illustrates such a memory map of a smart card CP. In the example described, the storage means M specifically include a memory part 1 of the ROM type and a memory part 2 of the EEPROM type. Again in the example described, eight blocks of twelve bytes of digital date $B_1$ through $B_8$ representing the aforementioned public key n are stored in the "ROM" memory 1. In each of these eight blocks $B_1$ through $B_8$, there is an intentionally erroneous byte, arbitrarily the bytes $O_1$ through $O_8$. Eight correct bytes $O'_1$ through $O'_8$ corresponding to these erroneous bytes $O_1$ through $O_8$ are stored in the "EEPROM" memory 2.

We will now describe the steps for the secure loading of a so-called fabrication key into the smart card.

The first phase of the method according to the invention consists in the authentication of the "SAM" vis-à-vis the smart card CP.

This phase specifically includes a step for the calculation by the "SAM" of a cryptogram, using an asymmetric secret key corresponding to the asymmetric public key n contained in the card. In practice, the key is composed of two first numbers, which will arbitrarily be called p and q. The asymmetric secret key of the "SAM" will arbitrarily be called $K_{pq}$. In other words, the "SAM" is identified vis-à-vis the smart card CP and the latter recognizes its caller with the public key n.

Figure 2:
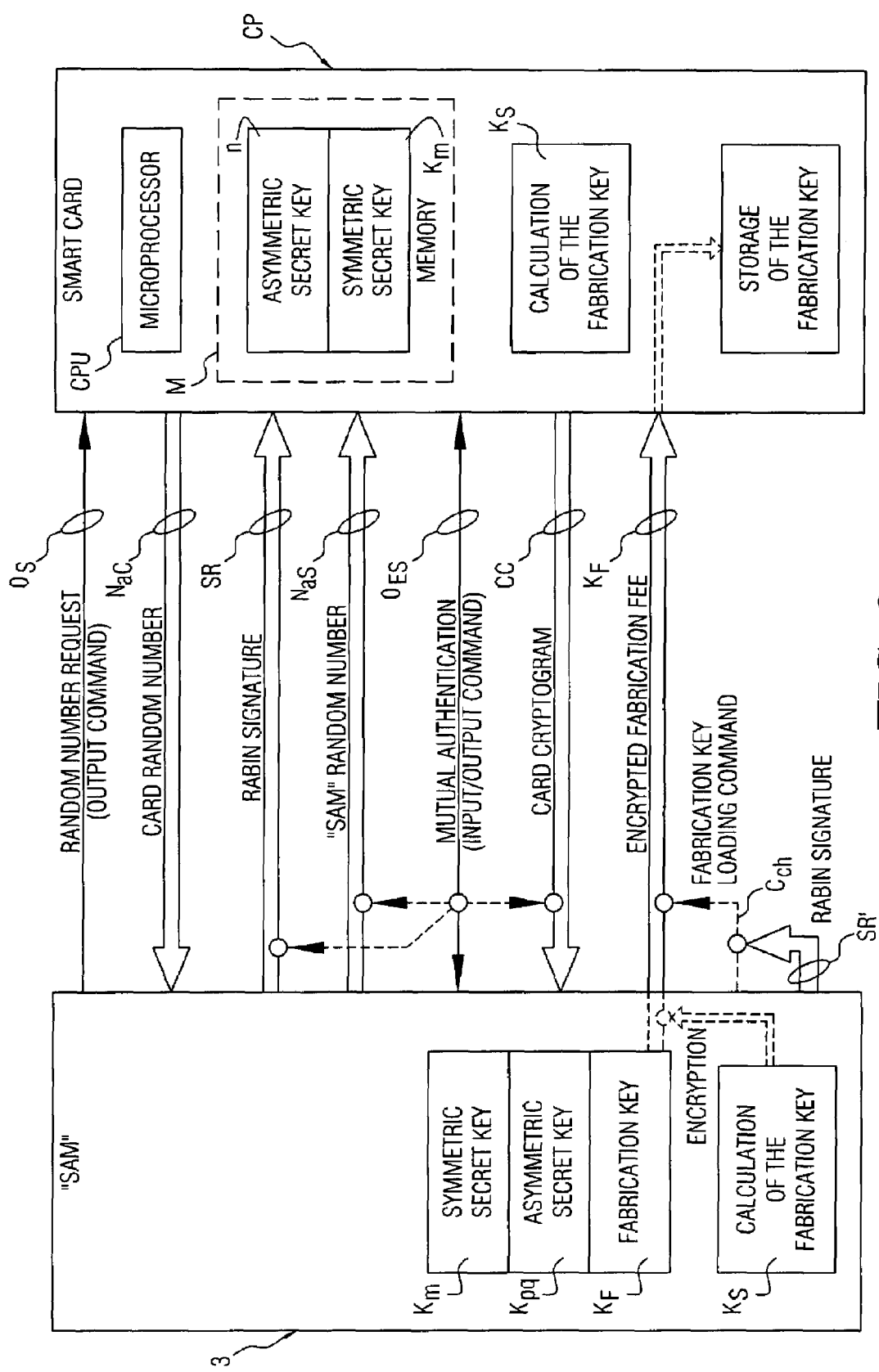
FIG. 2 schematically illustrates the main exchanges of information for the mutual authentication of a so-called "SAM" key-holding module and a smart card, according to the method of the invention.

As shown in FIG. 2, using an outgoing order $O_s$, the "SAM" 3 retrieves from the smart card CP a sixteen-byte random number $N_{aC}$. The number $N_{aC}$ will hereinafter be called the "card random number," and can be generated, for example, by the computing means of the smart card CP, in the example illustrated a microprocessor CPU. The "SAM" 3 also generates a sixteen-byte random number that will be called the "SAM random number" $N_{aS}$.

Figure 3:
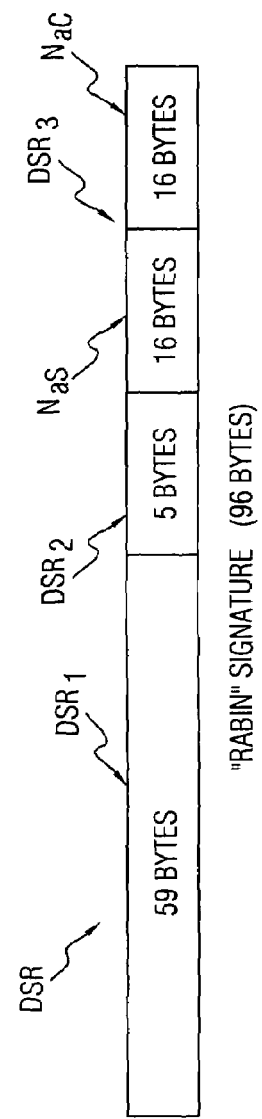
FIG. 3 illustrates an example of concatenated data used to calculate a Rabin signature on random numbers respectively generated by the smart card and the "SAM" module, according to an aspect of the method of the invention.

A Rabin signature, which will hereinafter be named SR, is calculated by the "SAM" 3 on ninety-six bytes of data, referenced DSR. This data DSR can conform to the concatenation illustrated by FIG. 3, in order to reach the aforementioned ninety-six bytes:

a fifty-nine byte filler string $DSR_1$, having for example the following static configuration: 01, FF, ... FF, in hexadecimal;

a five-byte so-called header string $DSR_2$ of the mutual authentication command; and thirty-two bytes $DSR_3$, constituted by the concatenation of the aforementioned numbers $N_{aS}$ and $N_{aC}$.

The five-byte header string of the mutual authentication command, $DSR_2$, can advantageously be constituted by the contents of a command of the type known as an "APDU" if the smart card CP is read by a smart card reader using a protocol in accordance with the standards ISO 7816-1 through ISO 7816-4. More precisely, it can be the code associated with a loading instruction.

Referring again to FIG. 2, the Rabin signature SR and the random number $N_{aS}$ are sent to the smart card CP by means of an input-output order $O_{ES}$, indicating a mutual authentication. The "SAM" 3 alone is capable of generating this signature SR, since the secret key it stores is never divulged. The smart card CP verifies the Rabin signature using the asymmetric public key n that it stores, which makes it possible to authenticate the "SAM" 3.

The second phase of the method consists in the authentication of the smart card CP vis-à-vis the "SAM" 3, so as to complete the mutual authentication of the two entities.

From the secret master key $K_M$ and from the aforementioned sixteen-byte random number $N_{aC}$, the smart card CP generates a sixteen-byte symmetric, secret so-called session key $K_S$, making it possible to calculate a cryptogram specific to the smart card CP.

Preferably, this secret session key $K_S$, called an authentication key, is obtained by performing in encryption using an algorithm of the Triple DES type on both parts, $N_{aC1}$, and $N_{aC2}$, of the card random number $N_{aC}$.

Figure 4:
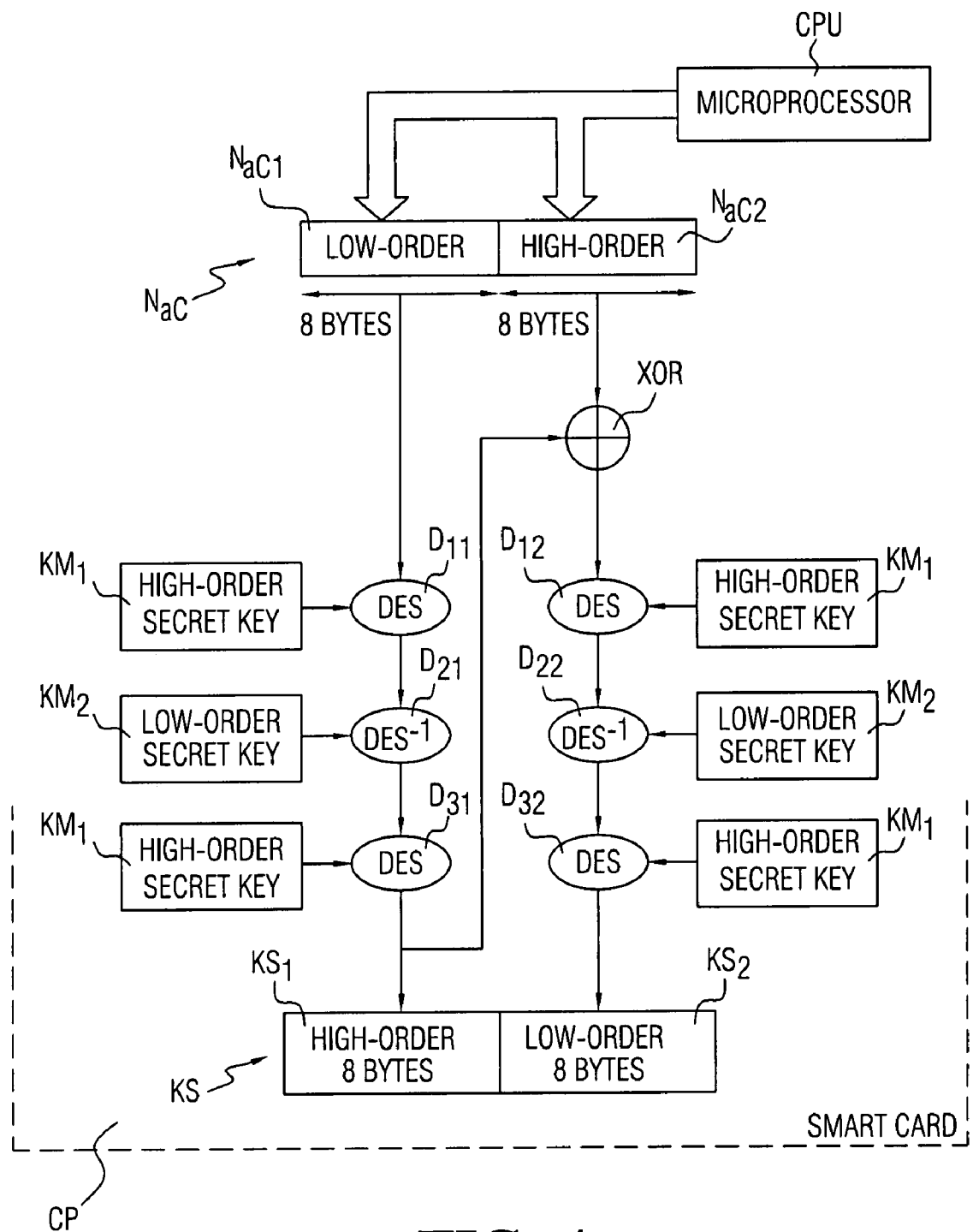
FIG. 4 illustrates, in an example, the generation of a session key in the smart card, according to an aspect of the invention.

More precisely, the process for calculating the secret session key $K_S$ is executed as illustrated by the diagram of FIG. 4.

As is well known, an encryption with an algorithm of the Triple DES type includes, in cascade, a first encryption using a key (in this case the secret master key $K_M$) via a direct DES, a second DES of the inverse type, and a third DES, also direct.

In the eight-byte "low-order" part $N_{aC1}$ of the smart card random number $N_{aC}$, the Triple DES is performed directly using three cascaded modules, referenced $D_{11}$, $D_{21}$ and $D_{31}$. The modules $D_{11}$ and $D_{31}$ receive, through their key inputs, the same key value, in this case the eight-byte "high-order" part $K_{M1}$ of the key $K_M$, while the module $D_{21}$ receives in its key input the "low-order" part $K_{M2}$, also eight bytes. On output from the module $D_{31}$, the eight-byte "high-order" part $K_{S1}$ of the secret session key $K_S$ is obtained. This eight-byte word $K_{S1}$ can be temporarily stored in a storage register or in a part of the RAM with which the smart card CP is normally equipped.

The part $K_{S1}$ is re-injected through a first input of a logic circuit of the "exclusive-OR" type, referenced XOR. The latter receives, in a second input, the eight-byte "high-order" part $N_{aC2}$ of the smart card random number $N_{aC}$. The output of the logic circuit XOR is transmitted to the input of a Triple DES encryption chain. This Triple DES is performed using three cascading modules. referenced $D_{12}$, $D_{22}$ and $D_{32}$. As above, the modules $D_{12}$ and $D_{32}$ receive, through their key inputs, the same key value, in this case the eight-byte "high-order" part $K_{M1}$ of the key $K_M$, while the module $D_{22}$ receives in its key input the "low-order" part $K_{M2}$, also eight bytes. On output from the module $D_{32}$, the eight-byte "low-order" part $K_{S2}$ of the secret session key $K_S$ is obtained. This eight-byte word $K_{S2}$ can also be temporarily stored in a storage register or in a part of the RAM.

The secret key $K_M$ can be present in ROM, or "probe" written in EEPROM, as mentioned above.

It is clear that the "exclusive-OR" logic operation can be performed by means of software instead of using a specific logic circuit XOR, by calling a routine stored in "ROM" memory 1, for example, under the control of the microprocessor CPU. Likewise, the "DES" and "DES$^{-1}$" operations are generally performed by means of algorithms stored in "ROM" memory 1, again under the command of the microprocessor CPU. The intermediate results are stored in registers or in RAM.

The "SAM" 3 is capable of calculating the same secret session key $K_S$ in the manner just described, since the latter also stores the secret master key $K_M$.

In an additional step, the smart card CP generates a byte string that will hereinafter be called the "card cryptogram" CC. The latter is obtained by encrypting the "SAM" random number transmitted to the smart card CP using the secret session key $K_S$ that has just been calculated.

Figure 5:
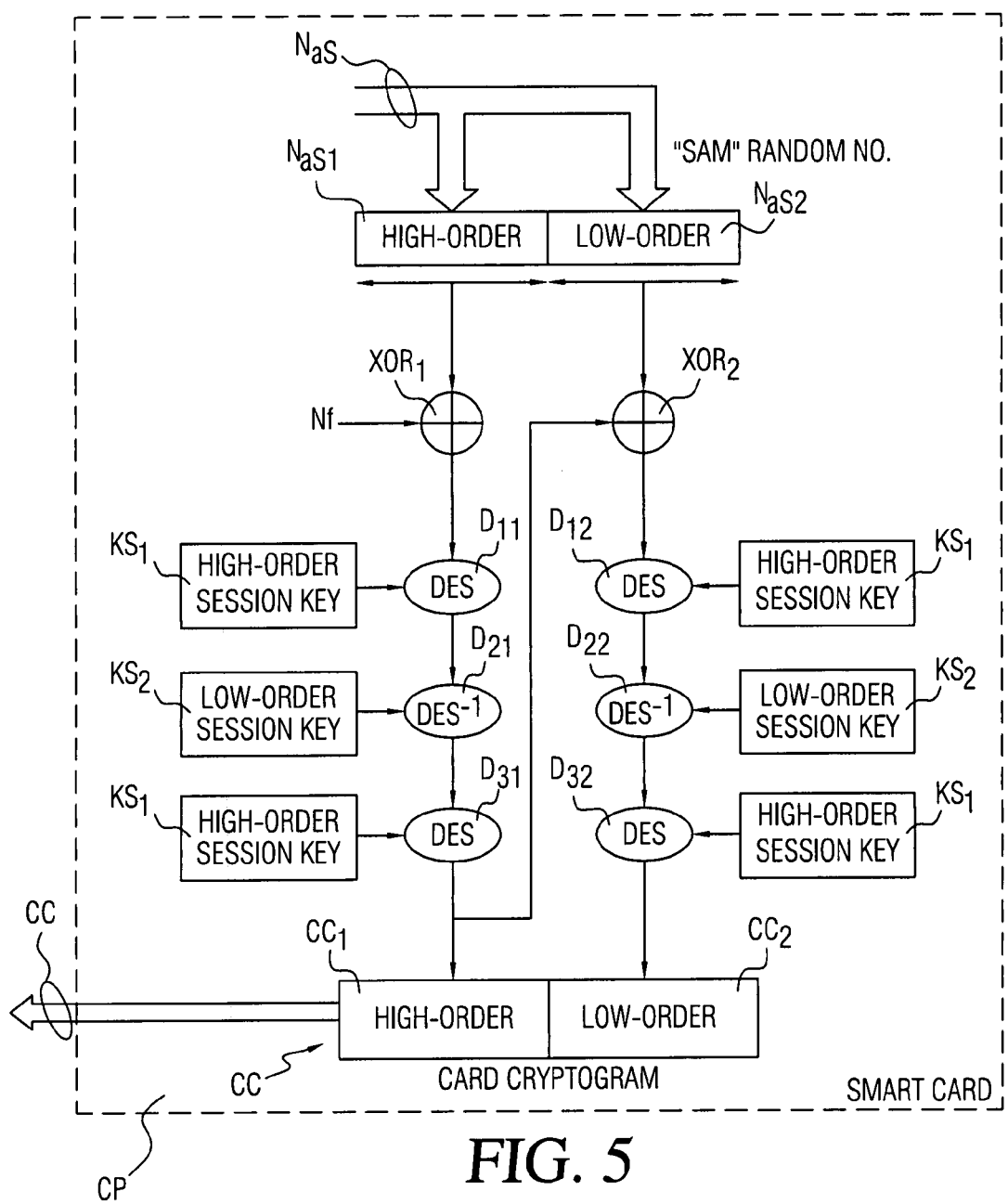
FIG. 5 illustrates, in an example, the generation of a cryptogram in the smart card, according to an aspect of the invention.

FIG. 5 illustrates the process. The latter is similar to the one that made it possible to calculate the secret session key $K_S$. It can particularly use "exclusive-OR" and encryption functions in accordance with the Triple DES algorithm. Also, the elements in common with the preceding figures have the same references, and will be re-described only as necessary.

The "SAM" random number $N_{aS}$ has been received from the "SAM" 3 and is temporarily stored in a register or other storage location. The eight-byte high-order part $N_{aS1}$ of this random number $N_{aS}$ is subjected to a Triple DES by the chain $D_{11}$ à $D_{31}$. However, it is first subjected to an "exclusive-OR" logic operation with an initial chaining value of eight bytes $N_f$, of hexadecimal value "00," by means of a first circuit $XOR_1$ (or by a software process). It is the output from this circuit $XOR_1$ that is transmitted to the aforementioned chain. The encryption key is the secret session key $K_S$ calculated in the preceding step. More precisely, the key inputs of the "DESs" $D_{11}$ et $D_{31}$, receive the eight highest-order bytes $KS_1$ of this key $K_S$, and the key input of the DES $D_{21}$ receives the eight lowest-order bytes $K_{S2}$.

This process makes it possible to calculate the eight highest-order bytes $CC_1$ of the cryptogram CC. These bytes $CC_1$ are re-injected as input into the Triple DES encryption chain $D_{12}$ à $D_{32}$ for the lowest-order bytes $N_{aS2}$ of the "SAM" random number $N_{aS}$, more exactly into one of the inputs of a second "exclusive-OR" circuit $XOR_2$, the first input receiving the eight lowest-order bytes of the random number $N_{aS}$. It is the output from this circuit $XOR_2$ that is transmitted to the aforementioned chain. The key inputs of the "DESs" $D_{12}$ et $D_{32}$ receive the eight highest-order bytes $K_S$, of this key $K_S$, and the key input of the DES $D_{22}$ receives the eight lowest-order bytes $K_{S2}$. The output of the DES $D_{32}$ generates the eight low-order bytes $CC_2$ of the card cryptogram CC.

This cryptogram is transmitted to the "SAM" 3 by means of the input-output order OES (FIG. 2) for mutual authentication. At the end of this step, the "SAM" 3 can authenticate the smart card CP from the card cryptogram $CC_1$ since it has also calculated the session key $K_S$, as mentioned above.

The last step consists of loading said fabrication key $K_F$ into the memory of the smart card CP, using a loading command $C_{ch}$. This key $K_F$ is protected by encryption by means of the secret session key $K_S$, in a mode known as "CBC" (for "Cipher Block Chaining").

If the loading command fails, the session key $K_S$ is lost and a new mutual authentication is necessary, with a calculation of a new session key.

Figure 6:
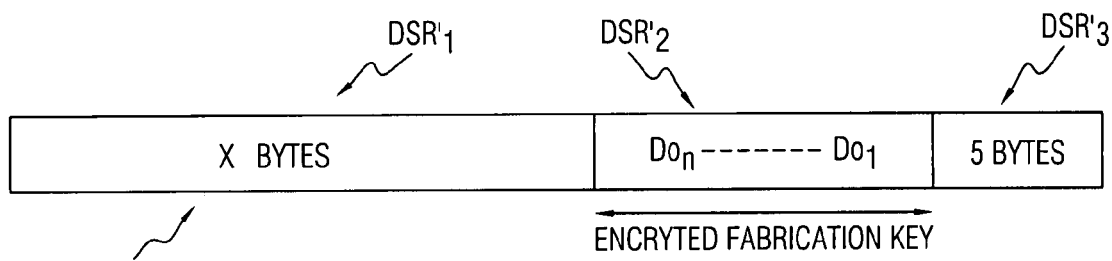
FIG. 6 illustrates an example of concatenated data used to calculate a Rabin signature, calculated by the SAM on the command for loading the fabrication key before it is transferred, encrypted, into the smart card.

The loading command is signed by means of a Rabin signature by the "SAM" 3. FIG. 6 schematically illustrates the data DSR' used to calculate a Rabin signature SR'.

In all, DSR' comprises ninety-six bytes. In the example, DSR' comprises three parts:
  a header $DSR'_3$, advantageously an "APDU" command as in the case of FIG. 2;
  encrypted data $DSR'_2$, or $Do_1$ through $Do_n$, representing the fabrication key $K_F$ (with n being the total number of bytes of the fabrication key $K_F$); and
  static filler data $DSR'_1$, or x bytes, for example with the configuration: 01, FF . . . FF, in hexadecimal (the value of x is chosen so that the total number of bytes of DSR' is equal to ninety-six).

Through the reading of the above, it is easy to see that the invention achieves the stated objects.

In particular, the loading of the fabrication key subsequently used to secure the steps for pre-initializing the smart card CP takes place with a very high level of security. The method makes it possible to load, into each smart card CP, its own key, or in other words a different key than the other smart cards.

However, although it allows this key diversification, the method does not make it necessary to resort to long and costly operations of the type indicated, known as "probe writing by the chip manufacturer."

It should be clear, however, that the invention is not limited to just the exemplary embodiments explicitly described, particularly in connection with FIGS. 1 through 6.

As indicated above, although the Rabin algorithm is particularly advantageous, as it consumes few computing resources, this algorithm could be replaced by other types of asymmetric algorithms, such as "RSA." The same goes for the algorithm of the Triple DES type. Other symmetric key algorithms can be used without going beyond the scope of the invention. This is merely a technological choice that is within the capability of one skilled in the art, and depends particularly on the precise application envisaged.

Likewise, the precise numerical values, the number of bytes or other elements, are indicated only to illustrate the concepts and do not in any way limit the scope of the invention. In particular, as is well known, the length of the encryption keys depends on the degree of security one expects to achieve, and can result from technological choices, for example linked to the standards in force and/or to the types of algorithms chosen.

Lastly, as indicated, the invention is not limited to smart card-based applications only. It can be applied in the context of any embedded system comprising a microchip or similar device, into which it is necessary to load a key for securing predetermined operations.

The operations in question can be pre-initialization operations, as described in detail, but also other types of operations.

For example, it is possible to subject sensitive commands from a so-called open smart card, such as the loading of libraries of the type known as "APIs" ("Application Program Interface") or various codes, into the EEPROM part, to a mutual authentication between the loading device and the smart card, the mutual authentication process being executed according to the method of the invention.

In general, it is possible, from the smart card point of view, to assign a public key and a symmetric secret key to each type of operation to be secured. The session key derived during the authentication mechanism can subsequently be used to secure the loading of another key for a dedicated use, such as protecting libraries of the aforementioned "API" type or "patches," i.e. the application of binary data to replace all or part of an existing program.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

We claim:

1. A method for secure loading of a key dedicated to securing a predetermined operation into a memory of a microchip of an embedded system, said dedicated key being contained in a security device that includes means for two-way communication with said microchip, wherein said memory of said microchip is adapted to store a symmetric secret encryption key and an asymmetric public key and said security device is adapted to store the symmetric secret encryption key and an asymmetric secret key corresponding to the public key of said microchip, said method comprising the steps of:
  authenticating said security device by generating a first random number using the microchip, transmitting the first random number to the security device, generating a second random number in the security device, generating in the security device a first cryptogram from said first and second random numbers by applying an asymmetric signature algorithm using said asymmetric secret key, transmitting at least the first cryptogram to said microchip, and authenticating the security device by verifying the first cryptogram in the microchip using said public key;
  authenticating said microchip to said security device by generating, in said microchip, a secret session key from said first random number by applying a symmetric encryption algorithm using said symmetric secret encryption key, generating in said microchip a second cryptogram by applying a symmetric encryption algorithm on said second random number, wherein said second random number is received by the microchip from the security device, using said secret session key, transmitting said second cryptogram to said security device, and authenticating said microchip in the security device by verifying said second cryptogram using said session key to obtain said second random number, said receiving said second random number by the micro chip from the security device and said transmitting said second cryptogram from the microchip to the security device being performed in response to a mutual authentication command which is received by said microchip; and transferring said dedicated key, encrypted by said session key, into said storage means of said microchip.

2. A method according to claim 1, wherein said step for transferring said dedicated key is activated by a key loading command, and is signed by applying an asymmetric signature algorithm.

3. A method according to claim 1, wherein said asymmetric algorithm is the so-called Rabin algorithm.

4. A method according to claim 3, wherein said first and second random numbers have a length of sixteen bytes, and wherein said first cryptogram is obtained by applying said Rabin algorithm to a concatenation of said first and second random numbers having a first given number of bytes forming a header and a second given number of filler bytes, so that a total length of said concatenation is ninety-six bytes, equivalent to a length of said public key.

5. A method according to claim 3, wherein said dedicated key is encrypted by said secret session key and is concatenated with bytes forming a header and a given number of filler bytes, so that the total length of said concatenation is ninety-six bytes, and wherein said concatenation is signed by applying said Rabin algorithm, before said transfer to said smart card.

6. A method according to claim 1, wherein said symmetric algorithm is the so-called Triple DES algorithm.

7. A method according to claim 6, wherein said first random number and said secret key have a length of sixteen bytes, and wherein said step for generating said secret session key comprises:

applying said Triple DES algorithm to eight lowest-order bytes of said first random number, said triple DES algorithm being applied using, in cascade, a direct DES having as an encryption key eight highest-order bytes of said secret key, an inverse DES having as an encryption key eight lowest-order bytes of said secret key, and another direct DES having as an encryption key eight highest-order bytes of said secret key, said triple DES algorithm producing eight highest-order bytes of said secret session key;

applying an "exclusive-OR" logic operation (XOR) between said eight highest-order bytes and eight lowest-order bytes of said first random number; and applying said Triple DES algorithm to a result of said logic operation, said Triple DES algorithm using, in cascade, a direct DES having as an encryption key eight highest order bytes of said secret key, an inverse DES having as an encryption key eight lowest order bytes of said secret key, and another direct DES having as an encryption key eight highest order bytes of said secret key, said Triple DES algorithm generating eight lowest-order bytes of said secret session key, said highest-order bytes and lowest-order bytes together forming said secret session key.

8. A method according to claim 6, wherein said second random number and said secret session key having a length of sixteen bytes, and wherein said step for generating said cryptogram of the card comprises:

applying an "exclusive-OR" logic operation between eight highest-order bytes of said second random number and eight static bytes with the hexadecimal value 00;

applying said Triple DES algorithm to a result of said logic operation, said Triple DES algorithm using, in cascade, a direct DES having as an encryption key eight highest order bytes of said secret session key, an inverse DES having as an encryption key eight lowest order bytes of said secret session key, and another direct DES having as an encryption key eight highest-order bytes of said secret session key, said Triple DES algorithm generating eight highest-order bytes of said second cryptogram;

applying an "exclusive-OR" logic operation between said eight highest-order bytes and eight lowest-order bytes of said first random number; and applying said Triple DES algorithm to a result of said logic operation, said Triple DES algorithm using, in cascade, a direct DES having as an encryption key eight highest order bytes of said secret session key, an inverse DES having as an encryption key eight lowest order bytes of said secret session key, and another direct DES having as an encryption key eight highest-order bytes of said secret session key, said Triple DES algorithm generating of said second cryptogram, said highest-order and lowest order bytes together forming said second cryptogram.

9. A method according to claim 1, wherein said embedded microchip system is a smart card, and wherein said dedicated key is a fabrication key used to secure pre-initialization operations of the smart card.

10. An embedded microchip system comprising a data processor and a data memory adapted to cooperate with a security device via two-way communication in order to receive a key dedicated for securing predetermined operations, said data memory adapted to store a symmetric secret encryption key and an asymmetric public key and said security device adapted to store a same symmetric secret encryption key and an asymmetric secret key corresponding to said public key, said microchip system comprising:

means for generating a first random number for transmission to said security device, means for receiving from said security device, within input parameters of a mutual authentication command sent to said microchip system, a second random number and a first authentication cryptogram, generated from said first random number and a second random number, by applying an asymmetric algorithm and using said secret key, means for generating a secret session key from said first random number by applying a symmetric algorithm and using said secret key, means for generating a second cryptogram from said second random number received from said security device by applying a symmetric algorithm and using said secret session key, means for sending said second cryptogram to said security device as an output of the mutual authentication command received, there by enabling said security device to authenticate said microchip system by verify in said second cryptogram using said session key to obtain said second random number, means for receiving from said security device said dedicated key, encrypted using said session key, and means for storing said dedicated key in said storage means.

11. A system according to claim 10, further comprising:

a smart card in which said data processor and memory are incorporated, and wherein said dedicated key is a fabrication key and wherein said operations to be secured are operations for pre-initializing said smart card.

* * * * *

UNITED STATES PATENT AND TRADEMARK OFFICE
CERTIFICATE OF CORRECTION

| | | |
|---|---|---|
| PATENT NO. | : 7,602,920 B2 | Page 1 of 1 |
| APPLICATION NO. | : 10/049025 | |
| DATED | : October 13, 2009 | |
| INVENTOR(S) | : Patrice Hameau, Nicolas Fougeroux and Benoit Bole | |

It is certified that error appears in the above-identified patent and that said Letters Patent is hereby corrected as shown below:

Column 10 – Line 65, Claim 10 delete "verify in" and replace with --verifying--

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,602,920 B2 |
| APPLICATION NO. | : 10/049025 |
| DATED | : October 13, 2009 |
| INVENTOR(S) | : Hameau et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2138 days.

Signed and Sealed this

Fifth Day of October, 2010

David J. Kappos
*Director of the United States Patent and Trademark Office*